US008423815B2

(12) United States Patent
Abe

(10) Patent No.: US 8,423,815 B2
(45) Date of Patent: Apr. 16, 2013

(54) INFORMATION PROCESSING DEVICE CAPABLE OF PERFORMING A TIMER CONTROL OPERATION

(75) Inventor: Yasuhiko Abe, Saitama-Ken (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 499 days.

(21) Appl. No.: 12/108,084

(22) Filed: Apr. 23, 2008

(65) Prior Publication Data

US 2008/0301484 A1 Dec. 4, 2008

(30) Foreign Application Priority Data

May 30, 2007 (JP) ................................ P2007-144015

(51) Int. Cl.
*G06F 1/04* (2006.01)
(52) U.S. Cl.
USPC ........... 713/502; 713/300; 713/323; 713/324; 455/566; 455/574
(58) Field of Classification Search .................. 713/300, 713/322, 323, 324, 340, 501, 502; 455/566, 455/574
See application file for complete search history.

(56) References Cited

U.S. PATENT DOCUMENTS

| 5,175,759 A * | 12/1992 | Metroka et al. ............ 455/569.1 |
| 5,548,832 A * | 8/1996 | Karam ........................ 455/226.4 |
| 5,737,323 A * | 4/1998 | Lansdowne ................... 370/311 |
| 5,758,278 A * | 5/1998 | Lansdowne ................ 455/343.4 |
| 5,844,435 A * | 12/1998 | Grundvig ....................... 327/151 |
| 5,859,640 A * | 1/1999 | de Judicibus .................. 715/710 |
| 5,881,377 A * | 3/1999 | Giel et al. .................... 455/343.1 |
| 5,894,580 A * | 4/1999 | Yoshida ......................... 713/340 |
| 5,950,120 A * | 9/1999 | Gardner et al. ............. 455/343.1 |
| 5,974,551 A * | 10/1999 | Lee ................................. 713/300 |
| 6,009,319 A * | 12/1999 | Khullar et al. ............... 340/7.38 |
| 6,029,061 A * | 2/2000 | Kohlschmidt ................ 455/574 |
| 6,091,031 A * | 7/2000 | Lee et al. .................... 178/18.01 |
| 6,141,568 A * | 10/2000 | Sakaguchi ..................... 455/566 |
| 6,246,888 B1 * | 6/2001 | Tsuchiyama .................. 455/566 |
| 6,278,887 B1 * | 8/2001 | Son et al. ...................... 455/566 |

(Continued)

FOREIGN PATENT DOCUMENTS

| JP | 9-108393 A | 4/1997 |
| JP | 2002-223467 A | 8/2002 |
| JP | 2005-110050 A | 4/2005 |

OTHER PUBLICATIONS

Huawei Technologies Co. Ascend II. User Guide. 2011.*

(Continued)

*Primary Examiner* — Matthew D Spittle
(74) *Attorney, Agent, or Firm* — Maschoff Brennan

(57) ABSTRACT

An information processing device, such as cellular phone, includes a first timer set for executing count processing applied to a preassigned first processing, a second timer set for executing count processing applied to the preassigned first processing, a display state determination unit configured to determine a display state of a display unit, and a timer switching unit configured to select and set the first timer for the preassigned first processing at a time when the display state determination unit determines that the display unit is in an "ON" state and to select and set the second timer for the preassigned first processing at a time when the display state determination unit determines that the display unit is in an "OFF" state.

11 Claims, 3 Drawing Sheets

U.S. PATENT DOCUMENTS

| | | | |
|---|---|---|---|
| 6,311,081 B1* | 10/2001 | Northcutt et al. | 455/574 |
| 6,748,199 B2* | 6/2004 | Nakano | 455/192.2 |
| 6,963,340 B1* | 11/2005 | Alben et al. | 345/501 |
| 6,971,036 B2* | 11/2005 | Freed | 713/322 |
| 7,197,341 B2* | 3/2007 | Bultan et al. | 455/574 |
| 7,200,379 B2* | 4/2007 | Edwards et al. | 455/343.1 |
| 7,266,158 B2* | 9/2007 | Matsumura | 375/295 |
| 7,269,677 B2* | 9/2007 | Misaka et al. | 710/260 |
| 7,415,293 B1* | 8/2008 | Lee | 455/574 |
| 7,496,774 B2* | 2/2009 | Lu | 713/322 |
| 7,551,911 B2* | 6/2009 | Shohara et al. | 455/343.1 |
| 7,702,371 B2* | 4/2010 | Edwards et al. | 455/574 |
| 8,028,187 B2* | 9/2011 | Chen | 713/600 |
| 2002/0188880 A1* | 12/2002 | Lowles et al. | 713/322 |
| 2006/0053315 A1* | 3/2006 | Menzl | 713/300 |

OTHER PUBLICATIONS

Hossein et al. Smart Screen Management on Mobile Phones. Technical Report. Jun. 24, 2009.*

Falaki et al. Diversity in Smartphone Usage. MobiSys '10. Jun. 18, 2010.*

Japanese Office Action dated Apr. 28, 2009 (2 pages), issued in counterpart Japanese Application Serial No. 2007-144015.

\* cited by examiner

INFORMATION PROCESSING DEVICE CAPABLE OF PERFORMING A TIMER CONTROL OPERATION

BACKGROUND OF THE INVENTION

1. Field of the Invention

The present invention relates to an information processing device, and more particularly, to a cellular phone capable of performing a timer control operation in consideration of a display state of a display unit and a power saving.

2. Related Art

Wireless terminals such as a cellular phone, as a typical example of an information processing device, continuously save power without operating a main control unit by carrying out a designated operation (job) at the scheduled time, after elapse of a predetermined period, or at preset time intervals. To attain the power-saving function, a timer provided to the main control unit of the cellular phone is used. The timer periodically executes a predetermined operation after the elapse of a predetermined period or at preset time intervals.

There are two types of timers, a hard timer and a soft timer, which are used in combination while characteristics of these timers are utilized (see Japanese Unexamined Patent Application Publication No. 2005-110050, for example).

Examples of the hard timer include a constant-period hard timer that outputs signals at regular intervals and a hard timer such as a real time clock. Such a hard timer continues counting even if a CPU (Central Processing Unit) is in an "OFF" state (sleep state). Upon time-out, the hard timer sends an interrupt signal to the main control unit to notify a unit for running an application about the time-out. In contrast, the soft timer is updated in accordance with a program. If the CPU shows an "OFF" state (sleep state), the soft timer does not execute counting. When the CPU is turned on, it is determined whether a time-out has occurred. If the time-out has occurred, the timer notifies a unit for running an application about the time-out.

The cellular phone disclosed in Japanese Unexamined Patent Application Publication No. 2005-110050 change a period at which the timer generates a polling timing signal depending on an on/off state of the display unit of the cellular phone. Thus, when the display unit shows an "OFF" state, an intermittent operation cycle is lengthened to thereby reduce the power consumption.

A GUI (Graphical User Interface) is displayed, for example, on the display unit of the cellular phone by an application involved in display processing such as scrolling, blinking, or scrolling a marquee. If a soft timer is used for timer-based processing on the application for displaying the GUI, when the CPU is in the "OFF" state, the soft timer stops its operation and waits until the CPU is turned on in response to the next interrupt processing, and then, performs predetermined processing after time-out. Hence, if the CPU of the cellular phone is in an "ON" state, the GUI display processing is appropriately performed. In contrast, if the CPU is in an "OFF" state, the unit for running an application is not notified of the time-out, and the GUI display processing is not appropriately performed.

For this purpose, the following is conceivable. That is, the display unit of the cellular phone is not turned on/off in synchronism with the shift to an on/off state of the CPU. For example, even if the display unit is in the "ON" state, the CPU may be turned off under control. Assuming that such a control is applied to the cellular phone, the following problem would occur.

For example, when the display unit of the cellular phone is turned on, and any application executes GUI display processing such as blinking, if the CPU is shifted to an off state, a soft timer for appropriately executing the GUI display processing such as blinking does not work. As a result, even though the display unit of the cellular phone is turned on, the unit for running an application is not notified of the time-out, and the GUI display processing is not appropriately performed, so a user cannot view GUI contents.

To solve the above problem, the application for displaying the GUI might be controlled using a hard timer all the time irrespective of on/off state of the CPU. However, it is not desirable to execute the GUI display processing such as blinking even through the display unit is turned off and a user cannot view a displayed GUI screen from the viewpoint of saving power consumption.

SUMMARY OF THE INVENTION

The present invention has been accomplished in view of the above circumstances, and an object of the present invention is to provide an information processing device such as cellular phone capable of saving power consumption with high efficiency and controlling a display state of a display unit without any trouble.

This and other objects can be achieved according to the present invention by providing an information processing device, comprising:

a first timer set for executing count processing applied to a preassigned first processing;

a second timer set for executing count processing applied to the preassigned first processing;

a display state determination unit configured to determine a display state of a display unit; and a timer switching unit configured to select and set the first timer for the preassigned first processing at a time when the display state determination unit determines that the display unit is in an "ON" state and to select and set the second timer for the preassigned first processing at a time when the display state determination unit determines that the display unit is in an "OFF" state.

The information processing device of the above aspect may further comprise: a time-out determination unit configured to determine whether the first timer times out upon time-out of the first timer if the first timer is used for a preassigned second processing and the second timer is used for the preassigned first processing; and a time-out notification unit configured to notify, if the time-out determination unit determines that the second timer times out, a unit for running the preassigned second processing about the time-out, and a unit for running the preassigned first processing about the time-out.

The preassigned second processing may be a processing of an application necessary for executing wireless communications through a base station including at least a processing for checking call waiting and processing for achieving synchronization with a communication network.

The information processing device of the above aspect may further comprise: a third timer set for executing counting processing on predetermined processing at a constant period; a time-out determination unit configured to determine whether the second timer times out upon time-out of a third timer at a time when the third timer is used for a preassigned third processing and the second timer is used for the preassigned first processing; and a time-out notification unit configured to notify, if the time-out determination unit determines that the second timer times out, a unit for running the preassigned third processing about the time-out, and a unit for running the preassigned first processing about the time-out.

The preassigned third processing may be a processing of an application necessary for periodically obtaining information about an information processing device including at least field intensity of the information processing device and remaining battery charge of a battery power supply for supplying power to the information processing device.

It may be further desired that preassigned first processing is a processing of an application for executing GUI display processing including at least scrolling processing, blinking processing and marquee scrolling processing.

In a preferred embodiment, the information processing device may be a cellular phone.

The information processing device of the present invention of the characters mentioned above can save power consumption with high efficiency and control a display state of a display unit without any trouble in consideration of the display state of the display unit and power saving.

The nature and further characteristic features of the present invention will be made clearer from the following descriptions made with reference to the accompanying drawings.

DESCRIPTION OF THE PREFERRED EMBODIMENTS

Figures 1, 2:
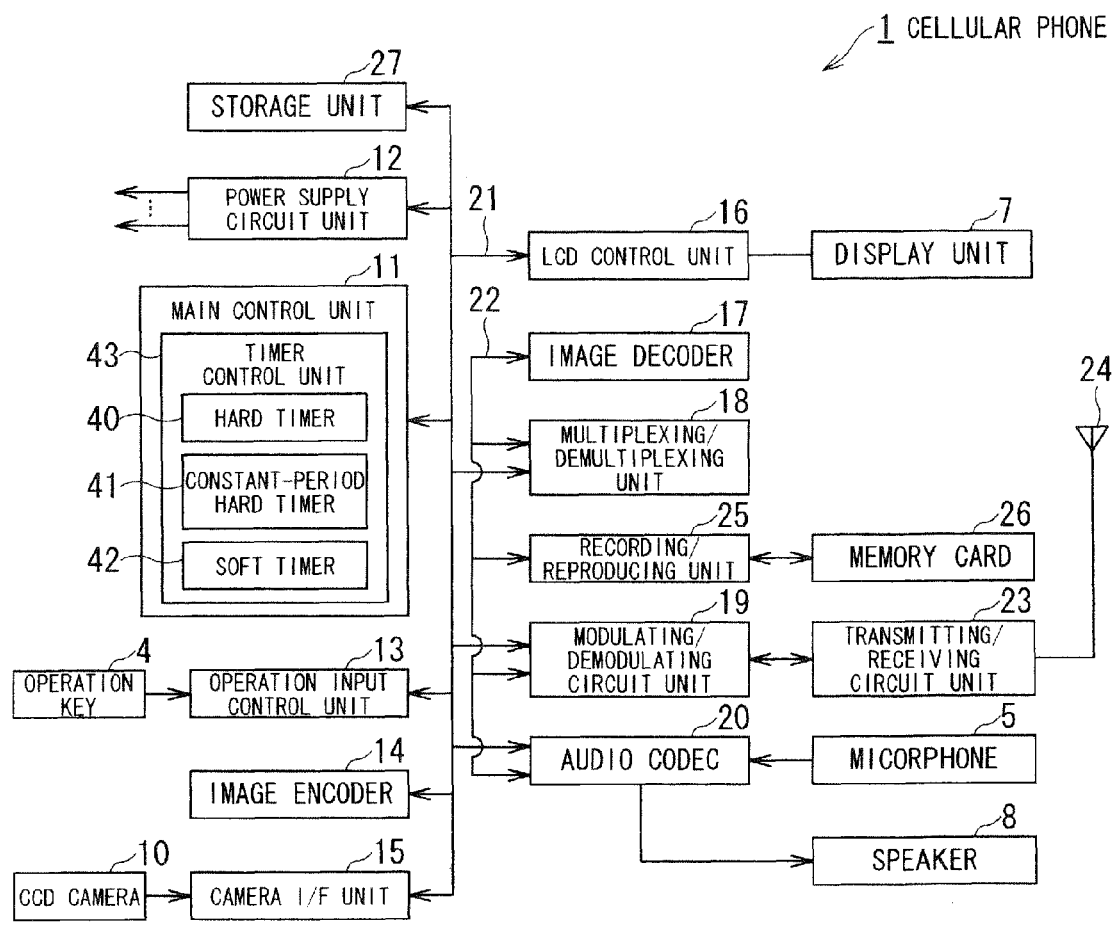
FIG. 1 is a block diagram showing an internal configuration of a cellular phone applicable to an information processing device according to the present invention.
FIG. 2 illustrates on/off states of a display unit and a CPU in a main control unit.

A cellular phone according to one typical embodiment of an information processing device of the present invention will be described hereunder with reference to the accompanying drawings, in which FIG. 1 shows the internal configuration of an example of the cellular phone.

As shown in FIG. 1, in a cellular phone 1 as an information processing device of the present invention, with respect to a main control unit 11 that exercises control over individual units of the cellular phone 1, a power supply circuit unit 12, an operation input control unit 13, an image encoder 14, a camera interface unit 15, an LCD control unit 16, a multiplexing/demultiplexing unit 18, a modulating/demodulating circuit unit 19, an audio codec 20, and a storage unit 27 are respectively connected through a main bus 21. In addition, the image decoder 17, the multiplexing/demultiplexing unit 18, the modulating/demodulating circuit unit 19, the audio codec 20, and a recording/reproducing unit 25 are connected together through a synchronism bus 22.

The main control unit 11 includes a CPU, a ROM, and a RAM. The CPU executes various kinds of processing in accordance with programs stored in the ROM or various application programs loaded to the RAM from the storage unit 27 as well as generates various control signals and supplies the signals to the units to thereby comprehensively control the cellular phone 1. The RAM stores data necessary for the CPU to execute various kinds of processing as appropriate.

The main control unit 11 incorporates a timer for exactly measuring a certain period or time length, which is controlled with a timer control unit 43. A detailed description about the timer will be given hereunder.

The cellular phone 1 converts signals of sounds, which are picked up by a microphone 5 in a voice communication mode, into digital audio signals to compress the signal data with the audio codec 20, and then subjects the signal data to spectrum spreading with the modulating/demodulating circuit unit 19 and to digital-analog conversion and frequency conversion with a transmitting/receiving circuit unit 23 to send the resultant data through an antenna 24 under the control of the main control unit 11.

Further, the cellular phone 1 amplifies reception signals, which are received by the antenna 24 in a voice communication mode, with the transmitting/receiving circuit unit 23 so as to subject the amplified signals to frequency conversion and analog-digital conversion and to spectrum spreading with the modulating/demodulating circuit unit 19, and expands the resultant signals with the audio codec 20 to convert the expanded signals to analog audio signals. Then, the cellular phone 1 outputs the converted analog audio signals to the outside through a speaker 8.

Further, in the case of sending an e-mail in a data communication mode, the cellular phone 1 sends text data of the e-mail input through operations on an operation key 4 to the main control unit 11 through the operation input control unit 13. The main control unit 11 subjects the text data to spectrum spreading with the modulating/demodulating circuit unit 19 and to digital-analog conversion and frequency conversion with the transmitting/receiving circuit unit 23, and then sends the resultant data to a base station (not shown) through the antenna 24.

In contrast, in the case of receiving an e-mail in a data communication mode, the cellular phone 1 executes despreading on reception signals, which are received from a base station, not shown, through the antenna 24, to obtain the original text data and then, displays the data as an e-mail on a display unit 7 through the LCD control unit 16.

In the case of sending image signals in a data communication mode, the cellular phone 1 supplies image signals picked up with a CCD camera 10 to an image encoder 14 through a camera interface unit 15.

The image encoder 14 converts the image signals supplied from the CCD camera 10 into encoded image signals through compressive-coding in accordance with a predetermined compression-coding system, for example, MPEG4, and then sends the converted encoded image signals to the multiplexing/demultiplexing unit 18. At the same time, the cellular phone 1 sends sounds, which are picked up with the microphone 5 during image pickup with the CCD camera 10 to the multiplexing/demultiplexing unit 18 through the audio codec 20 as digital audio signals.

The multiplexing/demultiplexing unit 18 multiplexes encoded image signals supplied from the image encoder 14 and audio signals supplied from the audio codec 20 in accordance with a predetermined system, subjects the resultant multiplexed signals to spectrum spreading with the modulating/demodulating circuit unit 19 and to digital-analog conversion and frequency conversion with the transmitting/receiving circuit unit 23, and then sends the resultant signals through the antenna 24.

Furthermore, in the case of receiving data of a video file linked to a Web page, for example, in a data communication mode, the cellular phone 1 executes spectrum spreading on reception signals, which are received from a base station, not shown, through the antenna 24 and then sends the resultant multiplexed signals to the multiplexing/demultiplexing unit 18.

The multiplexing/demultiplexing unit 18 demultiplexes the multiplexed signals into encoded image signals and audio signals so as to supply the encoded image signals to the image decoder 17 and supply the audio signals to the audio codec 20 through the synchronism bus 22. The image decoder 17 decodes the encoded image signals in accordance with a decoding system corresponding to the predetermined encoding system such as MPEG4 to thereby generate reproduction video signals so as to supply the generated reproduction video signals to the display unit 7 through the LCD control unit 16. As a result, video data in the video file linked to the Web page, for example, is displayed. At the same time, the audio codec 20 converts the audio signals to analog audio signals and supplies the resultant signals to the speaker 8 to thereby reproduce audio signals in the video file linked to the Web page, for example.

The storage unit 27 includes an electrically rewritable or erasable flash memory element as a nonvolatile memory and an HDD. The storage unit stores various application programs executed by the CPU of the main control unit 11 and various data groups.

In addition, the main control unit 11 of the cellular phone 1 of FIG. 1 is provided with a hard timer 40, a constant-period hard timer 41 and a soft timer 42, which are individually controlled by the timer control unit 43.

In the timer control unit 43, the hard timer 40 as a first timer continues counting even if the CPU is in an "OFF" state (sleep state), and upon time-out, issues an interrupt signal to the main control unit 11 as a unit for running an application to notify the unit for running an application of the time-out.

Similar to the hard timer 40, the constant-period hard timer 41 as a third timer continues counting even if the CPU is in an "OFF" state (sleep state), and upon time-out, issues an interrupt signal to the main control unit 11 as a unit for running an application to notify the unit for running an application of the time-out. Further, while a counting cycle of the hard timer 40 can be freely set, the hard timer 41 notifies the unit for running an application of the time-out, at constant counting cycle, for example, every 5 seconds.

In this example, the hard timer 40 and the constant-period hard timer 41 may be integrated to one timer, not separately provided.

On the other hand, the soft timer 42 as a second timer is updated in accordance with any program. This timer stops counting if the CPU is in an "OFF" state (sleep state). After the CPU is turned on, the timer control unit 43 determines whether a time-out has occurred. If the time-out has occurred, the timer notifies the main control unit 11 as a unit for running an application about the time-out.

Next, an example of a timer control operation of the timer control unit 43 of this embodiment is described.

The timer control unit 43 is provided as a display-state determination unit, a timer switching unit, a time-out determination unit, and a time-out notifying unit.

To describe first processing preassigned for the timer control unit 43 to perform a timer-control operation, if an application used for GUI display processing, for example, scrolling, blinking, or scrolling a marquee (hereinafter referred to as "application A") operates, the timer control unit 43 functions as the timer switching unit to switch the hard timer 40 and the soft timer 42 to perform the timer processing under the control. The timer control unit 43 executes the control to select the hard timer 40 if the display unit 7 is turned on and to select the soft timer 42 if the display unit is turned off.

As for the second processing preassigned for the timer control unit 43 to perform a timer-control operation, if an application is used to realize wireless communications through a base station, for example, processing for checking call waiting or processing for achieving synchronization with a communication network (hereinafter referred to as "application B") operates on the main control unit 11, the timer control unit 43 executes the control so as to execute the timer processing with the hard timer 40.

As for the third processing preassigned for the timer control unit 43 to perform a timer-control operation, if an application used to obtain information about a field intensity of the cellular phone 1 or about remaining battery charge of a battery power supply for supplying power to the cellular phone 1, for example, at regular intervals (hereinafter referred to as "application C") operates on the main control unit 11, the timer control unit 43 executes the control so as to execute the processing with the constant-period hard timer 41.

The LCD control unit 16 is connected to the main control unit 11 of FIG. 1 to control processing executed on the display unit 7 by the main control unit 11. In this example, the CPU in the main control unit 11 of the cellular phone 1 is independently turned on/off regardless of on/off states of the display unit 7. For example, although the display unit 7 is turned off under the control of the LCD control unit 16, the CPU might be turned on. In contrast, although the display unit 7 is turned on under the control of the LCD control unit 16, the CPU might be turned off. FIG. 2 shows on/off states of the display unit 7 and the CPU in the main control unit 11.

Referring next to a flowchart of FIG. 3, a timer-control operation of the timer control unit 43 upon executing the application A in the cellular phone 1 will be described.

Figure 3:
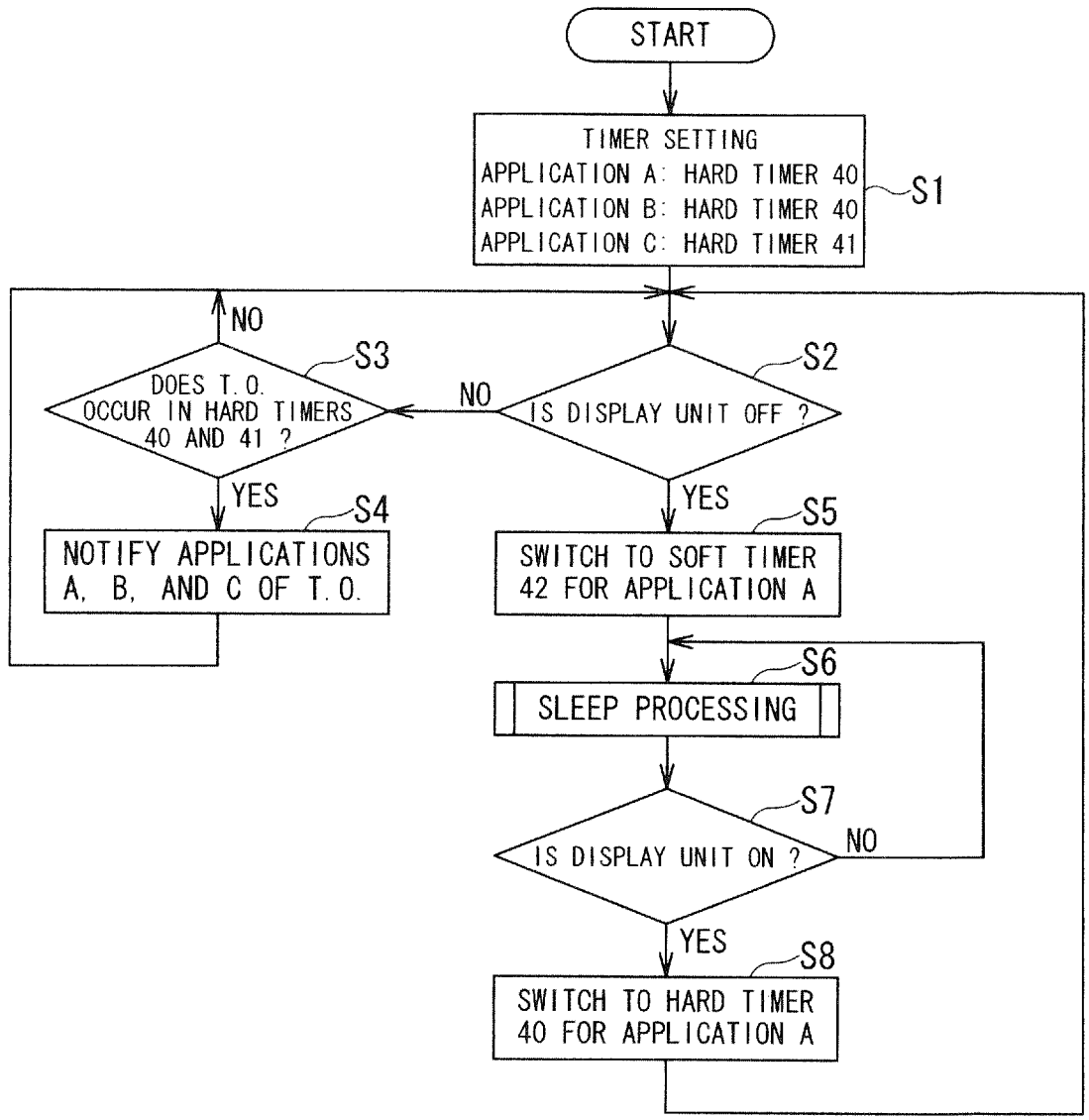
FIG. 3 is a flowchart of a timer control operation upon executing an application A in the cellular phone of FIG. 1.
Figure 4:
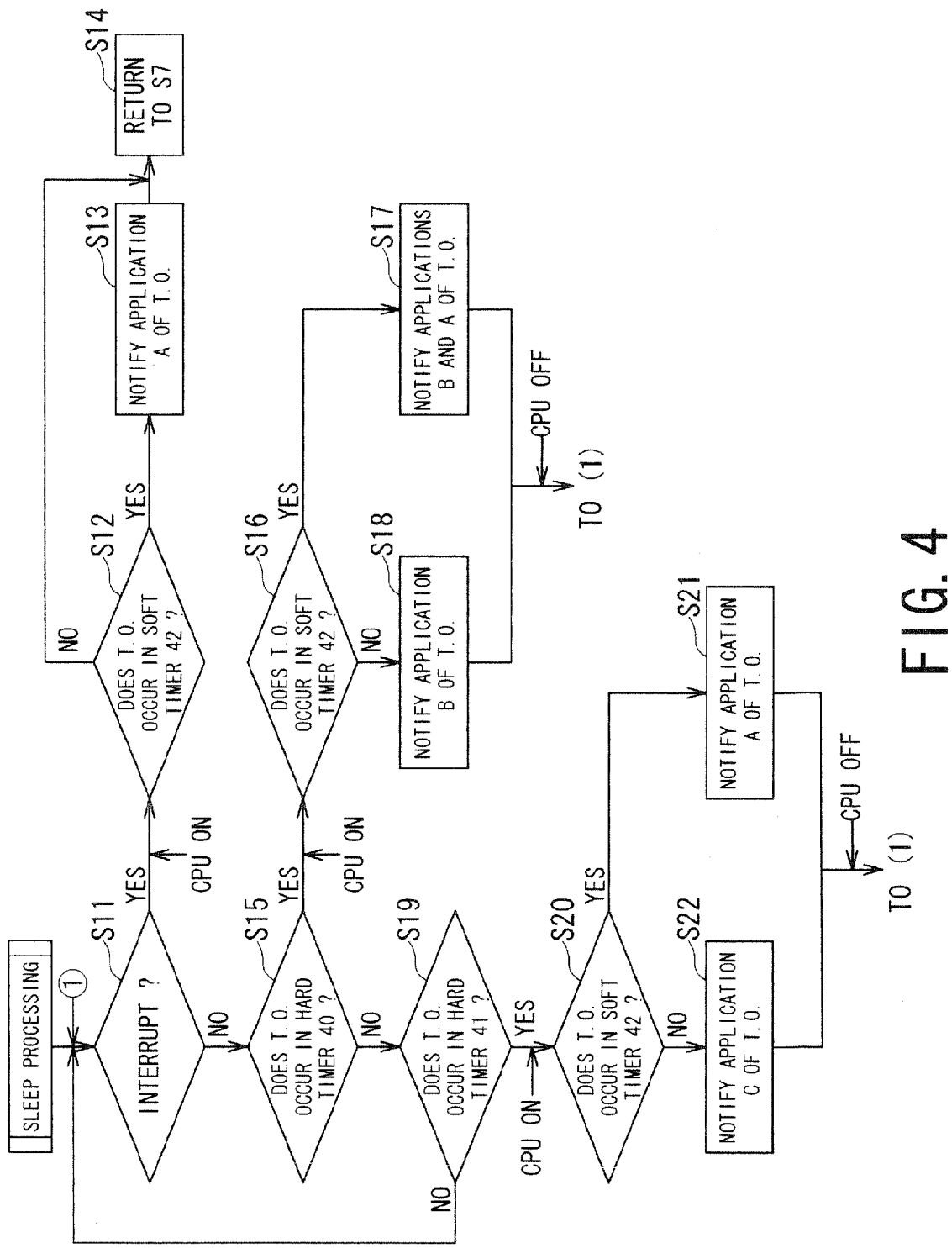
FIG. 4 is a flowchart of a timer control operation upon executing the application A in a sleep state.

When the main control unit 11 of the cellular phone 1 starts the application A, the timer control unit 43 starts control in accordance with the flowchart of FIG. 3. At this time, the CPU in the main control unit 11 of the cellular phone 1 and the display unit 7 are both in an "ON" state, that is, in a first state of FIG. 2.

In step S1, the main control unit 11 as a unit for running an application starts the application A, the timer control unit 43 receives a timer processing request with respect to the application A (for example, GUI display processing) from the main control unit 11, and then, sets the hard timer 40. At this time, the display unit 7 and the CPU in the main control unit 11 are in the first state of FIG. 2.

Further, the timer control unit 43 executes control to use the hard timer 40 for the application B (for example, processing for checking call waiting) and to use the constant-period hard timer 41 for the application C (for example, processing for obtaining information about remaining battery charge of a battery power supply).

In step S2, the timer control unit 43 functions as the display state determination unit to determine whether the display unit 7 is turned off. If the display unit 7 is turned on, in step S3, the timer control unit 43 functions as the time-out determination unit to determine whether a time-out has occurred in the hard timer 40 and the constant-period hard timer 41, which perform the timer processing on the applications A, B, and C, respectively. If a time-out has occurred in the hard timer 40 and the constant-period hard timer 41, in step S4, the timer control unit 43 functions as the time-out notification unit to notify the main control unit 11 about the time-out of the applications A, B, and C.

In the steps S3 and S4, the display unit 7 and the CPU in the main control unit 11 are in a first state of FIG. 2.

On the other hand, in the step S2 as a display state determination step, if confirming that the display unit 7 is turned off, the timer control unit 43 switches the hard timer 40 to the soft timer 42 so as to process the application A in step S5. In the step S5, the display unit 7 and the CPU in the main control unit 11 are in a fourth state of FIG. 2.

Next, in step S6, if the CPU in the main control unit 11 is turned off (sleep state) under a predetermined condition, the timer control unit 43 shifts to sleep processing. The predetermined condition means that the operation key 4 of the cellular phone 1 has not been pressed for a predetermined period or more or that a user closes the flip-type cellular phone 1, for example. A detailed description about what processing is executed on the application A by the timer control unit 43 in a sleep processing mode will be given hereunder. In the step S6, the display unit 7 and the CPU in the main control unit 11 are both in an "OFF" state, that is, a third state of FIG. 2.

In step S7, the timer control unit 43 functions as the display state determination unit to determine whether the display unit 7 is turned on. If the timer control unit 43 determines that the display unit 7 is kept off, the processing advances to the step S6 to carry out the sleep processing.

On the other hand, if determining that the display unit 7 is turned on, the timer control unit 43 functions as the timer switching unit to switch the soft timer 42 to the hard timer 40 so as to process the application A in step S8, and the processing advances to the step S2 as the display state determination step. In the step S8, the display unit 7 and the CPU in the main control unit 11 are in the first or second state of FIG. 2.

Next, a description is made to the timer control operation of the timer control unit 43 upon processing the application A in the step S6 as the sleep processing step in a flowchart of FIG. 3. At this time, the display unit 7 and the CPU in the main control unit 11 are both in the "OFF" state, that is, in the third state of FIG. 2.

In step S11, whether or not any interrupt occurs in the main control unit 11 is determined. Examples of the interrupt include an operation in which the operation key 4 of the cellular phone 1 is pressed and an operation in which a user opens the flip-type cellular phone 1. If any interrupt occurs, the CPU and the display unit 7 are in the "ON" state, that is, in the first state of FIG. 2.

If it is determined that an interrupt occurs in the step S11 as the interrupt determination step, in step S12, the timer control unit 43 determines whether a time-out has occurred in the soft timer 42 when the CPU is turned off. If the timer control unit 43 functions as the time-out determination to determine the fact that time-out has occurred in the soft timer 42, the timer control unit 43 functions as the time-out notification unit so as to notify the main control unit 11 as a unit for running the application A about the time-out in step S13. After that, the processing advances to the step S7 as the display state determination step in the flowchart of FIG. 3.

Further, in the step S12, if the timer control unit 43 determines that a time-out has not occurred in the soft timer 42, the processing advances to the step S7 as the display state determination step in the flowchart of FIG. 3.

On the other hand, in the step S11 as the interrupt determination step, if it is determined that no interrupt occurs, the timer control unit 43 functions as the time-out determination unit in the step S15 to determine whether a time-out has occurred in the hard timer 40 for processing the application B. If it is determined that time-out has occurred in the hard timer 40, the CPU is in the "ON" state, that is, in the fourth state of FIG. 2.

Following the determination as to time-out in the hard timer 40, the timer control unit 43 determines whether a time-out has occurred in the soft timer 42 for processing the application A in the step S16. If it is determined that time-out has occurred in the soft timer 42, the timer control unit 43 notifies the main control unit 11 about the time-out in the application A and the time-out in the application B in this order. Then, the CPU is turned off again, and the processing advances to the step S11 as the interrupt determination step.

Further, if it is determined that a time-out has not occurred in the soft timer 42 in the step S16 as the time-out determination step, the timer control unit 43 notifies the main control unit 11 about the time-out in the application B only in step S18. After this step, the CPU is turned off again, and the processing advances to the step S11 as the interrupt determination step.

After the processing in the steps S17 and S18 as the notification steps, the display unit 7 and the CPU in the main control unit 11 are in the third state of FIG. 2.

Further, although any interrupt does not occur in the interrupt determination step, if the application B for checking call waiting, for example, detects call waiting, the sleep processing mode for sending a notification about an incoming call may be shifted to the first state in FIG. 2, in which the CPU and the display unit 7 are both turned on. In this way, if an interrupt occurs through the processing of the application B, the processing advances to the step S7 as the display state determination step in the flowchart of FIG. 3.

On the other hand, if no time-out has occurred in the hard timer 40 in the step S15 as the time-out determination step, in step S19, the timer control unit 43 determines whether a time-out has occurred in the constant-period hard timer 41 for processing the application C, following the determination about the time-out in the hard timer 40.

If the timer control unit 43 determines that no time-out has occurred in the constant-period hard timer 41, the processing advances to the step S11 as the interrupt determination step without processing the application.

If the timer control unit 43 determines that a time-out has occurred in the constant-period hard timer 41, the CPU is in the "ON" state, that is, the fourth state of FIG. 2.

In step S20, the timer control unit 43 determines whether a time-out has occurred in the soft timer 42 for processing the application A following the determination as to the time-out in the constant-period hard timer 41. If it is determined that a time-out has occurred in the soft timer 42, in step S21, the timer control unit 43 notifies the main control unit 11 about the time-out in the application C and the time-out in the application A in this order. After this step, the CPU is turned off again, and the processing advances to the step S11 as the interrupt determination step.

Further, in the step S20 as the time-out determination step, if it is determined that no time-out has occurred in the soft timer 42, the timer control unit 43 notifies the main control unit 11 about the time-out in the application C only in the step S22. After that, the CPU is turned off again, and the processing advances to the step S11 as the interrupt determination step.

Further, after the processing in the steps S21 and S22 as the notification steps, the display unit 7 and the CPU in the main control unit 11 are in the third state of FIG. 2.

According to the cellular phone 1 having the above timer-controlled structure, timer processing is executed on an application for displaying a GUI by the soft timer if the display unit 7 is turned off and by the hard timer if the display unit 7 is turned on. If the display unit is in an off state in which a user cannot view GUI contents, unnecessary notification about the time-out is not issued. As a result, power consumption can be reduced with high efficiency in consideration of a display state of the display unit and its power saving.

Further, even if the CPU is turned off, whether a time-out has occurred in the soft timer is checked in synchronism with a time-out in the hard timer, timer processing can be applied to the application, so that the display state of the display unit can be controlled without any trouble.

Further, whether a time-out has occurred in the soft timer can be confirmed with reliability by using the constant-period hard timer that times out at regular intervals.

It is to be noted that, although the present invention was described hereinbefore with reference to the preferred embodiment of the cellular phone, it is applicable to the other electronic devices such as a PDA, a personal computer, a portable game machine, a portable music player and a portable video player.

The embodiment of the present invention describes the processing in which steps of the flowchart are chronologically executed in the described order. However, the steps may be executed in parallel or one by one, not in a chronological order.

In addition, these series of steps described with reference to the embodiment of the present invention may be executed by either software or hardware.

What is claimed is:

1. An information processing device comprising:
   a display unit that performs GUI display based on a GUI display processing;
   a CPU that is set in an ON state and an OFF state asynchronization with an ON state and an OFF state of said display unit;
   a first timer that executes count processing when said CPU is set in said ON state and said OFF state, the first timer configured to measure time by counting clock signal pulses;
   a second timer that executes count processing when said CPU is set in said ON state and does not execute count processing when said CPU is set in said OFF state, the second timer configured to measure time by counting clock signal pulses;
   a display state determining unit that determines said ON state and said OFF state of said display unit;
   a timer switching unit that sets said first timer to said GUI display processing when said display unit is determined to be in said ON state by said display determining unit and sets said second timer to said GUI display processing when said display unit is determined to be in said OFF state, irrespective of whether said CPU is set in said ON state or said OFF state;
   an operation unit causing said GUI display processing and second processing to operate, the second processing being different from said GUI display processing;
   a time-out determination unit that determines whether the timer set to said GUI display processing and said second processing times out; and
   a time-out notification unit that sends a predetermined time-out notification to said operation unit when said time-out determination unit determines that the timer set to said GUI display processing and said second processing times out, wherein said time-out determination unit further determines whether said second timer times out when said first timer times out in a case where said first timer is set to said second processing and said second timer is set to said GUI display processing when said CPU is set in said OFF state, and said time-out notification unit sends a timeout notification to said operation unit that causes said second processing to operate when said time-out determination unit determines that said second timer times out, and further sends a time-out notification to said operation unit that causes said GUI display processing to operate.

2. The information processing device as claimed in claim 1, wherein said second processing is a processing by an application necessary for performing a radio frequency communication in a base station, the processing relating to at least one of checking processing to check whether a call reception interruption exists and synchronization processing with a communication network.

3. The information processing device as claimed in claim 1, wherein said GUI display processing is processing by an application that performs GUI display processing including at least one of scrolling processing, blinking processing and marquee scrolling processing.

4. The information processing device as claimed in claim 1, wherein the information processing device is a cellular phone.

5. An information processing device comprising:
   a display unit that performs GUI display based on a GUI display processing;
   a CPU that is set in an ON state and an OFF state asynchronization with an ON state and an OFF state of said display unit;
   a first timer that executes count processing when said CPU is set in said ON state and said OFF state, the first timer configured to measure time by counting clock signal pulses;
   a second timer that executes count processing when said CPU is set in said ON state and does not execute count processing when said CPU is set in said OFF state, the second timer configured to measure time by counting clock signal pulses;
   a display state determining unit that determines said ON state and said OFF state of said display unit;
   a timer switching unit that sets said first timer to said GUI display processing when said display unit is determined to be in said ON state by said display determining unit and sets said second timer to said GUI display processing when said display unit is determined to be in said OFF state, irrespective of whether said CPU is set in said ON state or said OFF state;
   an operation unit causing said GUI display processing and third processing to operate, the third processing being different from said GUI display processing;
   a third timer that is set to periodically execute counting process at a fixed period, the third timer executes count processing when said CPU is set in said ON state and said OFF state;
   a time-out determination unit that determines whether the timer set to said GUI display processing and said third processing times out; and
   a time-out notification unit that sends a predetermined time-out notification to said operation unit when said time-out determination unit determines that the timer set to said GUI display processing and said third processing times out, wherein said time-out determination unit further determines whether said second timer times out when said third timer times out in a case where said third timer is set to said third processing and said second timer is set to said GUI display processing when said CPU is set in said OFF state, and said time-out notification unit sends a time-out notification to said operation unit that causes said third processing to operate when said time-out determination unit determines that said second timer times out, and further sends a time-out notification to said operation unit that causes said GUI display processing to operate.

6. The information processing device as claimed in claim 5, wherein said third processing is a processing of an application necessary for periodically obtaining information about an information processing device including at least field intensity of the information processing device and remaining battery charge power supply for supplying power to the information processing device.

7. The information processing device as claimed in claim 5, wherein said GUI display processing is processing by an application that performs GUI display processing including at least one of scrolling processing, blinking processing and marquee scrolling processing.

8. The information processing device as claimed in claim 5, wherein the information processing device is a cellular phone.

9. An information processing device comprising:
a display unit that performs GUI display based on a GUI display processing;
a CPU that is set in an ON state and an OFF state asynchronization with an ON state and an OFF state of said display unit;
a first timer that executes count processing when said CPU is set in said ON state and said OFF state, the first timer configured to measure time by counting clock signal pulses;
a second timer that executes count processing when said CPU is set in said ON state and does not execute count processing when said CPU is set in said OFF state, the second timer configured to measure time by counting clock signal pulses;
a display state determining unit that determines said ON state and said OFF state of said display unit;
a timer switching unit that sets said first timer to said GUI display processing when said display unit is determined to be in said ON state by said display determining unit and sets said second timer to said GUI display processing when said display unit is determined to be in said OFF state, irrespective of whether said CPU is set in said ON state or said OFF state;
an operation unit causing said GUI display processing to operate;
a time-out determination unit that determines whether the timer set to said GUI display processing times out;
a time-out notification unit that sends a predetermined time-out notification to said operation unit when said time-out determination unit determines that the timer set to said GUI display processing times out; and
an operation determination unit that determines whether an interruption operation exists, the interruption operation causing said CPU and said display unit to be set in said ON state,
wherein said time-out determination unit further determines whether said second timer times out when said operation determination unit determines that said interruption operation exists in a case where said second timer is set to said GUI display processing when said CPU is set in said OFF state, and said time-out notification unit sends a time-out notification to said operation unit that causes said GUI display processing to operate when said time-out determination unit determines that said second timer times out.

10. The information processing device as claimed in claim 9, wherein said GUI display processing is processing by an application that performs GUI display processing including at least one of scrolling processing, blinking processing and marquee scrolling processing.

11. The information processing device as claimed in claim 9, wherein the information processing device is a cellular phone.

* * * * *